United States Patent
Zhao et al.

(10) Patent No.: US 12,413,562 B2
(45) Date of Patent: Sep. 9, 2025

(54) SYSTEM AND METHODS OF CRYPTO CHAT

(71) Applicant: A&C TECHNOLOGY, INC., Newport Beach, CA (US)

(72) Inventors: Ye Zhao, Newport Beach, CA (US); Shihao Li, Irvine, CA (US); Han Qin, Newport Beach, CA (US); Zhen Sun, Chino Hills, CA (US); Hao Hsu, Newport Beach, CA (US); Jiayang Qin, Newport Beach, CA (US)

(73) Assignee: A&C TECHNOLOGY, INC., Newport Beach, CA (US)

( * ) Notice: Subject to any disclaimer, the term of this patent is extended or adjusted under 35 U.S.C. 154(b) by 489 days.

(21) Appl. No.: 18/052,675

(22) Filed: Nov. 4, 2022

(65) Prior Publication Data
US 2024/0154943 A1 May 9, 2024

(51) Int. Cl.
*H04L 9/40* (2022.01)
*H04L 51/04* (2022.01)

(52) U.S. Cl.
CPC .......... *H04L 63/0435* (2013.01); *H04L 51/04* (2013.01); *H04L 63/0861* (2013.01)

(58) Field of Classification Search
None
See application file for complete search history.

(56) References Cited

U.S. PATENT DOCUMENTS

| | | | | |
|---|---|---|---|---|
| 10,020,935 | B1* | 7/2018 | Ghetti | H04L 63/0815 |
| 10,095,874 | B1* | 10/2018 | Ghetti | H04L 9/088 |
| 11,909,868 | B2* | 2/2024 | Wall | H04L 9/0825 |
| 2013/0339726 | A1* | 12/2013 | Yoshida | H04L 63/0471 |
| | | | | 713/153 |
| 2018/0034854 | A1* | 2/2018 | Gong | H04L 63/061 |
| 2018/0331824 | A1* | 11/2018 | Racz | G08B 13/196 |
| 2023/0385437 | A1* | 11/2023 | Rohloff | G06F 21/6227 |
| 2024/0205005 | A1* | 6/2024 | Zhang | H04L 9/14 |

* cited by examiner

*Primary Examiner* — Joseph P Hirl
*Assistant Examiner* — Hassan Saadoun
(74) *Attorney, Agent, or Firm* — INNOVATION CAPITAL LAW GROUP, LLP; Vic Lin

(57) ABSTRACT

Apparatus, systems, and methods a crypto chat social software system can use the user's biological information to ensure the security of the account through a secure encryption method, which is not easy to be cracked, so that the user can fully control the security of his account. Encryption on each data generated by the user's application of social chat software is performed to ensure that only the users themselves can view the application's data and digital assets. The server storage can be decentralized in that al data stored and backed up are encrypted information. Accordingly, users' private data and digital assets cannot be stolen and abused. At the same time, the user's data will not be affected, the user still owns, and only the user owns their private data and digital assets.

19 Claims, 11 Drawing Sheets

SYSTEM AND METHODS OF CRYPTO CHAT

BACKGROUND OF THE INVENTION

1. Field of the Invention

Embodiments of the invention relate generally to social media and social chat platforms and methods used therewith. More particularly, embodiments of the invention relate to systems and methods that allow users to truly own their data privacy and digital assets in their social chat software, returning data ownership and privacy completely to the user.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The development trend of web 3.0 is the initial outlook definition of the Internet, where everyone is completely independent and connected to each other, but, currently, the web 2.0 technology relies on a centralized database to allow large companies to take users' data for profit, and the privacy and data properties of all users are not in their own hands.

At present, the mainstream chat software is centralized, and all user data is held in the database of the chat software development company. Software development companies can directly apply, buy, sell, call, occupy and tamper with user information and data by operating their own databases, so that the real owners of information and data cannot truly own their own digital assets.

Currently, the information security playbook in a user's social software depends on the security of the device. If the device where the application is located is lost or the centralized database where the data is stored is lost, the user's data privacy will be lost and leaked. Users do not have complete freedom of autonomy over their private data, and similarly, data assets are not entirely the user's own data assets.

At present, many application providers make profits by buying and selling users' private data, but these profits cannot be returned to users in the same way. The returns brought by the user's digital assets cannot be returned to the user himself, so the user's digital assets are not truly owned by the user.

Common software uses passwords to ensure account security when registering and logging in, and stores the passwords set by users in a centralized database to check whether they are correct to authenticate the account. However, once the centralized database is attacked, password security and account security are no longer guaranteed. Moreover, with the current technological means, passwords, composed of numbers, letters, and symbols, are also easily tampered with, and users' ownership, usage rights, and privacy rights to accounts cannot be fully guaranteed.

Moreover, once an entity has ownership of the account and successfully logs in through the password, the entity can easily grasp all the data and digital assets of the account, and it cannot be precisely guaranteed that the entity is the user themselves.

Biological information is one manner in which humans are differentiated from each other. Facial information, fingerprints, or any part of the body is extremely unlikely to be tampered with due to the uniqueness and complexity of biomolecules.

An asymmetric encryption algorithm is a method of keeping secret keys. Asymmetric encryption algorithms require two keys: a public key and a private key. The public key and the private key are a pair. If the data is encrypted with the public key, it can only be decrypted with the corresponding private key. Because encryption and decryption use two different keys, this algorithm is called an asymmetric encryption algorithm.

Symmetric encryption (also called private key encryption) refers to encryption algorithms that use the same key for encryption and decryption. Sometimes called traditional cryptographic algorithms, the encryption key can be deduced from the decryption key, and the decryption key can also be deduced from the encryption key. In most symmetric algorithms, the encryption key and the decryption key are the same, so this encryption algorithm is also called a secret key algorithm or a single key algorithm. It requires the sender and receiver to agree on a key before securely communicating.

In view of the foregoing, there is a need for systems and methods that allow users to truly own their data privacy and digital assets in their social chat software, returning data ownership and privacy completely to the user.

SUMMARY OF THE INVENTION

Embodiments of the present invention address the shortcomings of previous social chat software. Embodiments of the present invention provide apparatus, systems, and methods for a crypto chat social software system.

First, embodiments of the present invention can use the user's biological information to ensure the security of the account through a new and secure encryption method, which is not easy to be cracked, so that the user can fully control the security of his account. Second, embodiments of the present invention perform new encryption on each data generated by the user's application of social chat software, ensuring that only the users themselves can view the application's data and digital assets. Even if others gain access to the user's account through other means, they cannot further snoop and misuse data and digital assets that do not belong to them. Third, embodiments of the present invention realize decentralized social storage. All data stored and backed up are encrypted information. Even if data is lost or the database is attacked, the stolen or lost data is encrypted information. Users' private data and digital assets will not be stolen and abused. At the same time, the user's data will not be affected, the user still owns, and only the user owns their private data and digital assets.

One aspect of the present invention contemplates a chat social software configured to provide users with a decentralized encrypted chat platform.

Another aspect of the present invention relates to enabling users to use social chat software more securely, making their private data and digital assets generated through social chat software more private and secure.

Another aspect of the present invention relates to making social chat software more decentralized, with the effect of fully returning the user's digital asset ownership and privacy rights to the user.

More specifically, embodiments of the present invention provide a method for generating encryption keys for users of a social chat computer system comprising generating data for each user of each respective user; encrypting the data with an asymmetric encryption mechanism to generate encrypted gibberish to be used as a private key; and further encrypting the encrypted gibberish to generate a public key for each user.

Embodiments of the present invention further provide a method for securing a message sent from a first user to a second user within a social chat computer system comprising generating encryption keys for the first and second users by the steps of generating data for each of the first and second users of each of the first and second users; encrypting the data with an asymmetric encryption mechanism to generate encrypted gibberish to be used as the private key; and further encrypting the encrypted gibberish with a symmetric encryption mechanism to generate a public key for each user. The method further includes encrypting the message with the public key of the second user to generate second user encrypted gibberish; storing the second user encrypted gibberish in a server storage; sending, from the server storage, the second user encrypted gibberish to the second user; and decrypting the second user encrypted gibberish with the private key of the second user.

Embodiments of the present invention also provide a method for securing user data from a first user within a social chat computer system comprising generating encryption keys for the first user by the steps of generating data for the first user; encrypting the data with an asymmetric encryption mechanism to generate encrypted gibberish to be used as the private key; and further encrypting the encrypted gibberish with a symmetric encryption mechanism to generate a public key for the first user. The method further includes encrypting the user data with the public key of the first user to generate first user encrypted gibberish; storing the second user encrypted gibberish in a server storage; sending, from the server storage, the first user encrypted gibberish to the first user; and decrypting the first user encrypted gibberish with the private key of the first user to provide the user data to the first user.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1A:
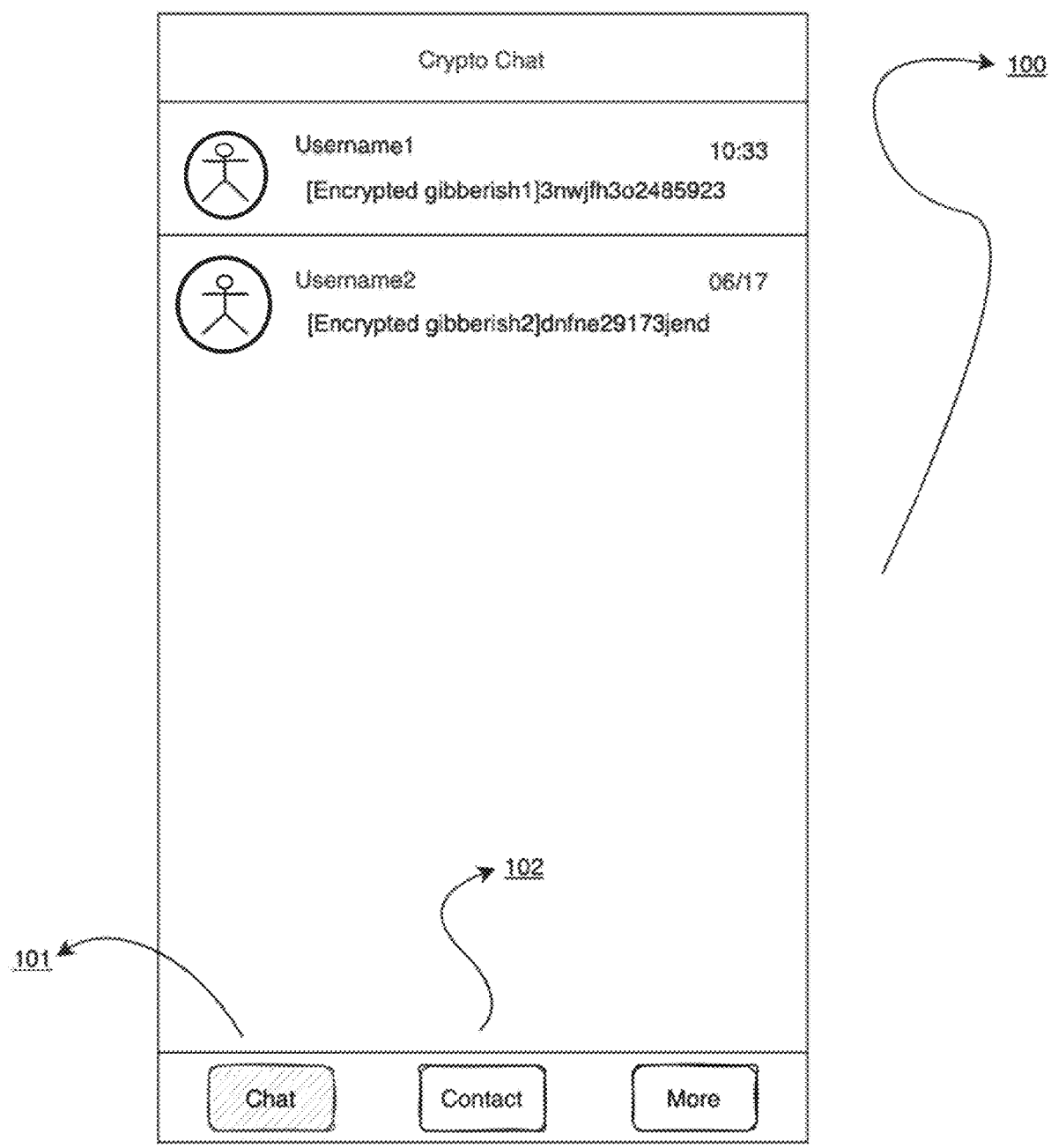
FIG. 1A illustrates an exemplary interface for a communication application according to an embodiment of the present invention.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

A "computer" or "computing device" may refer to one or more apparatus and/or one or more systems that are capable of accepting a structured input, processing the structured input according to prescribed rules, and producing results of the processing as output. Examples of a computer or computing device may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" or "application" may refer to prescribed rules to operate a computer. Examples of software or applications may include code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™ Jini™ C, C++, Smalltalk, Python, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code may also be distributed among a plurality of computational units wherein each unit processes a portion of the total computation.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Web sites comprise a collection of connected, or otherwise related, webpages. The combination of all the web sites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASHEEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G, 4G, 5G or the like.

Exemplary networks may operate with any of a number of protocols, such as Internet protocol (IP), asynchronous transfer mode (ATM), and/or synchronous optical network (SONET), user datagram protocol (UDP), IEEE 802.x, and the like.

Embodiments of the present invention may include apparatuses for performing the operations disclosed herein. An apparatus may be specially constructed for the desired purposes, or it may comprise a general-purpose device selectively activated or reconfigured by a program stored in the device.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory or may be communicated to an external device so as to cause physical changes or actuation of the external device.

Broadly, embodiments of the present invention provide apparatus, systems, and methods for a crypto chat social software system that can use the user's biological information to ensure the security of the account through a secure encryption method, which is not easy to be cracked, so that the user can fully control the security of his account. Encryption on each data generated by the user's application of social chat software is performed to ensure that only the users themselves can view the application's data and digital assets. The server storage can be decentralized in that al data stored and backed up are encrypted information. Accordingly, users' private data and digital assets cannot be stolen and abused. At the same time, the user's data will not be affected, the user still owns, and only the user owns their private data and digital assets.

FIG. 1A illustrates an example interface 100 for a communication application. In this interface 100, social chat applications can allow users to enter existing conversation interfaces, find contacts, and make other selections, as discussed in greater detail below.

A user may engage in a conversation/chat by using interface 100 to send messages. For example, interface 100 may include an existing conversation interface indication 101 and a contact interface indication 102. When editing a new message, a presentation may be presented that allows the user to locate the new message to an existing conversation via the conversation interface indication 101 and/or to designate a new set of recipients via the contacts interface 102 indication. A message may target an existing conversation if the specified recipient set corresponds to a recipient set for which the conversation already exists. If not, a new conversation can be created between the specified recipients.

The message may be tagged with the user's unique address corresponding to the identified username.

The interface 100 may display recent conversations and information about the conversations (e.g., usernames of the conversation objects, encrypted message fragments of the most recent messages, time, and sender of the most recent messages, and the like).

Figure 1B:
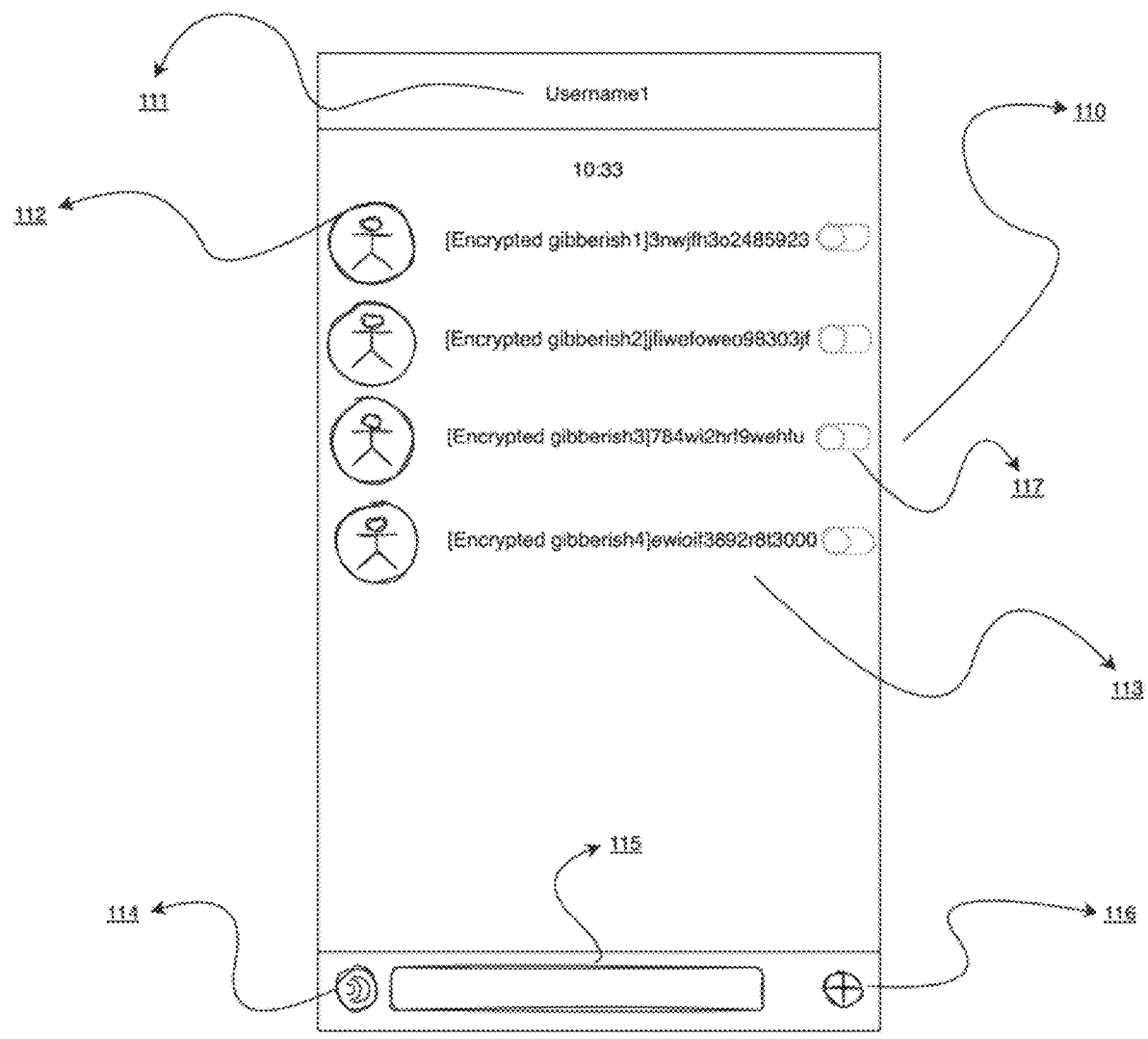
FIG. 1B illustrates an exemplary interface for communication with a specific contact following the establishment of an existing conversation, according to an embodiment of the present invention.

FIG. 1B illustrates an example interface 110 of communication with a specific contact following the establishment of an existing conversation. At this interface 110, the social chat application may allow the user to exchange communications one-to-one with other users of the communication service, for example, including but not limited to messages, pictures, voice, and video, and the like. The interface can display messages organized into conversations/chats.

The interface can display the username 111 of the recipient of the conversation to identify different recipients. The interface 110 may include the recipient's username 111 of the existing conversation, the recipient's avatar 112, and the encrypted message record 113. At the same time, the interface 110 can also enable the user to send a voice through the voice component 114 in the reply to operation interface, and the reply preview box 115 can display a preview of the reply input through the keyboard or other input devices, and the more operation selection button 116 can perform more operations. In addition, the interface 110 can display an independent, secure encryption key that only the user can use to unlock encrypted information via an unlock button 117.

Figure 1C:
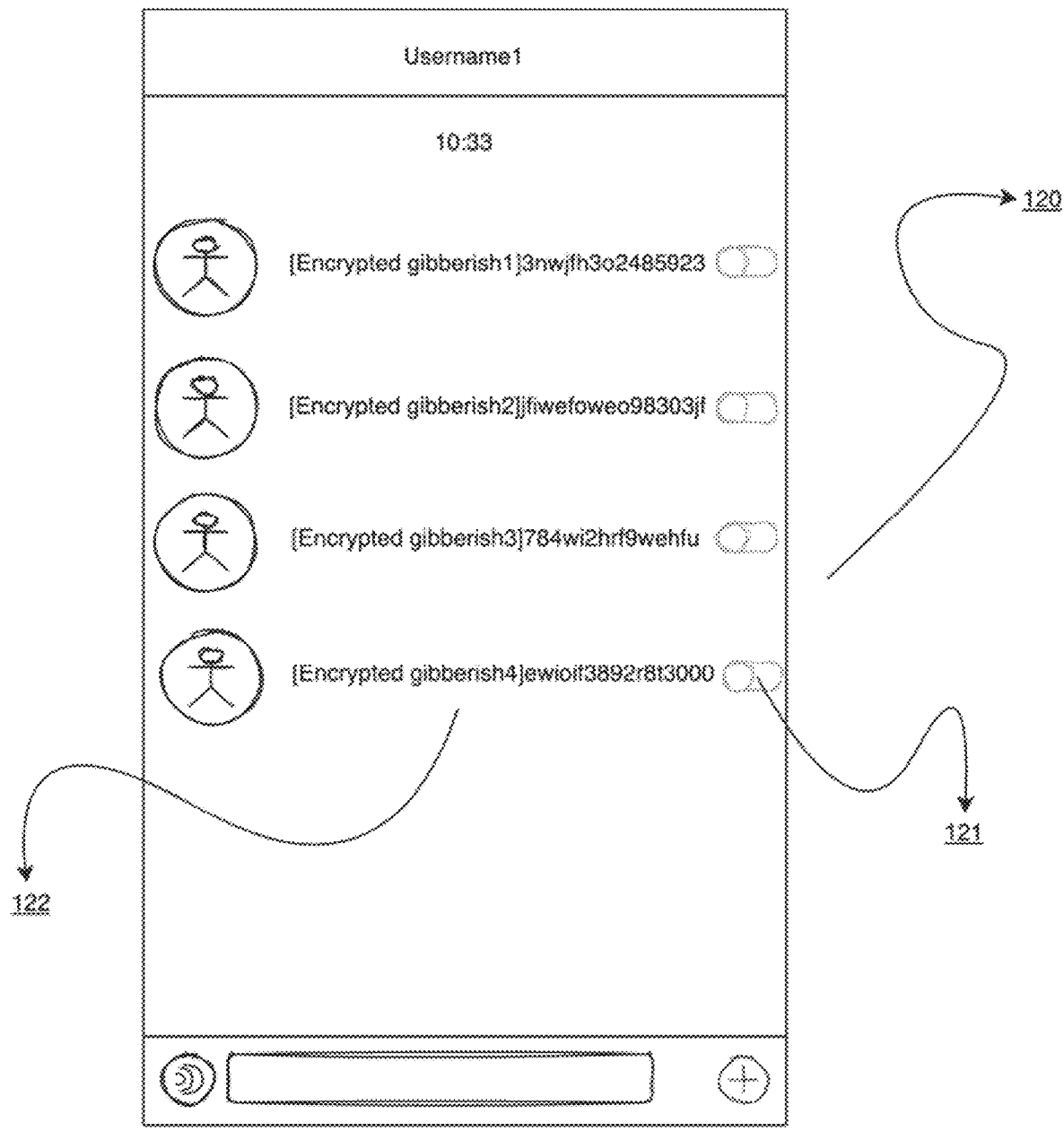
FIG. 1C illustrates an exemplary interface for communication with a specific contact following the establishment of an existing conversation, showing the encrypted presentation of the user's data information, according to an embodiment of the present invention.

FIG. 1C depicts an example interface 120 for communication with a specific contact following the establishment of an existing conversation. The figure further explains the encrypted presentation of the user's data information. The interface 120 includes a button 121 which can only be decrypted by the user's unique form of key and encrypted garbled information 122.

When the user enters any existing dialogue, the presented interface 120 can only present the encrypted garbled information 122, and with the decryption button 121, only the user can decrypt the information with his or her unique corresponding puzzle-solving key and see the real information content.

Figure 1D:
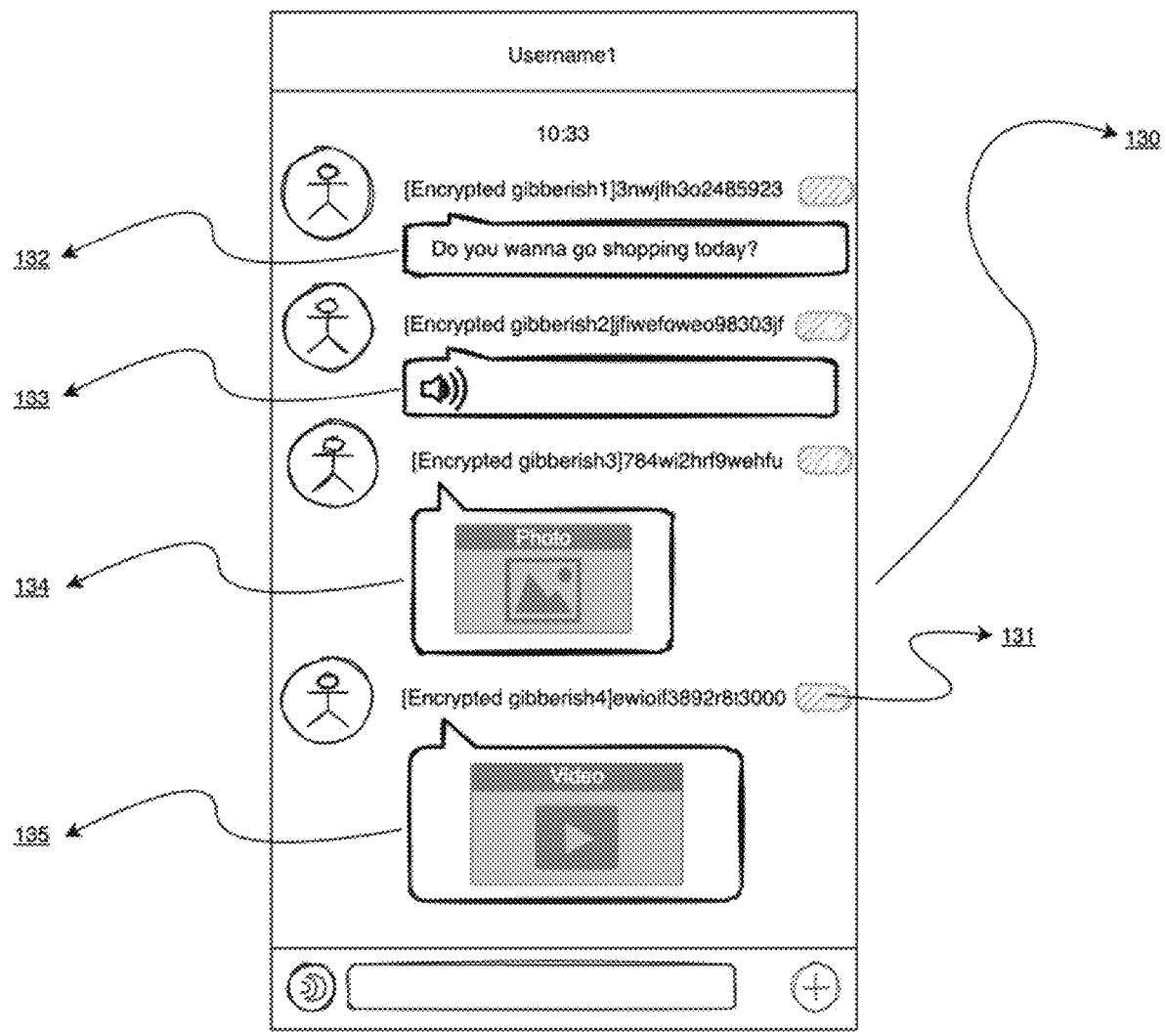
FIG. 1D illustrates an exemplary interface for decrypting communications for a specific contact followed by the establishment of an existing conversation, according to an embodiment of the present invention.

FIG. 1D depicts an example interface 130 for decrypting communications for a specific contact followed by the establishment of an existing conversation. The interface 130 may include the username of the recipient of the existing conversation, the avatar of the recipient, the encrypted message record, an unlocked button 131, decrypted text message 132, a decrypted voice message 133, a decrypted photo message 134, and a decrypted video message 135.

After the user decrypts the encrypted message by encrypting and decrypting via the sliding button 131, the verification mechanism possessed by the device will be used to verify the user's unique unlocking key corresponding to the account. When the verification is successful, the decrypted message of the encrypted message is directly displayed. Only the users themselves can access the real user privacy data, ensuring the security of the user privacy data of the social chat software.

Figure 1E:
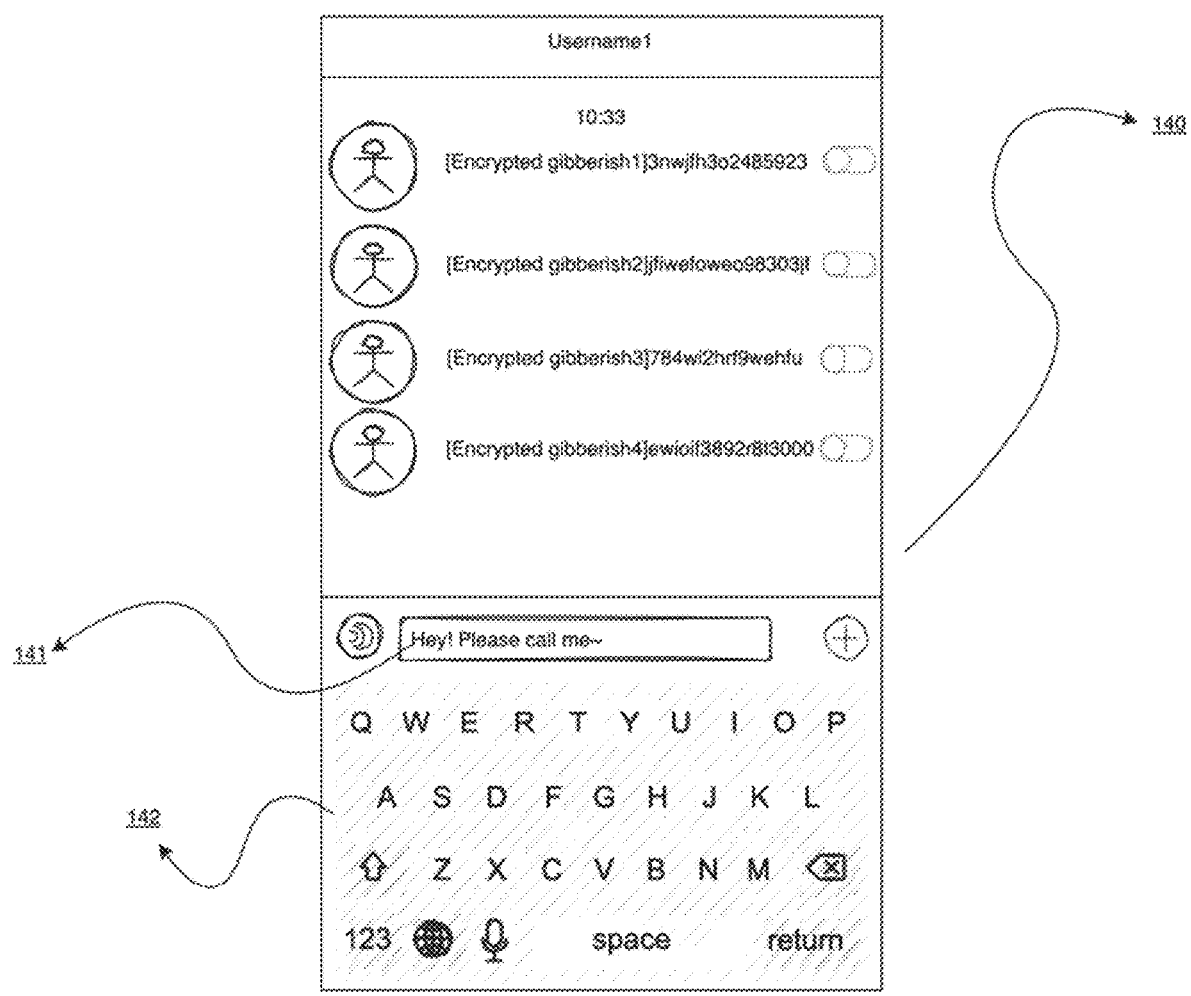
FIG. 1E illustrates an exemplary interface for a user to send a message to a specific contact, according to an embodiment of the present invention.

FIG. 1E depicts a method interface 140 for a user to send a message to a specific contact after an existing conversation is established. The interface 140 may include the recipient's username of the existing conversation, the recipient's avatar, the encrypted message record, the unlock button, a user's message input box (reply preview box) 141, and an input tool medium 142. The reply preview box 141 displays a preview of the reply entered via the keyboard or another input device.

Figure 1F:
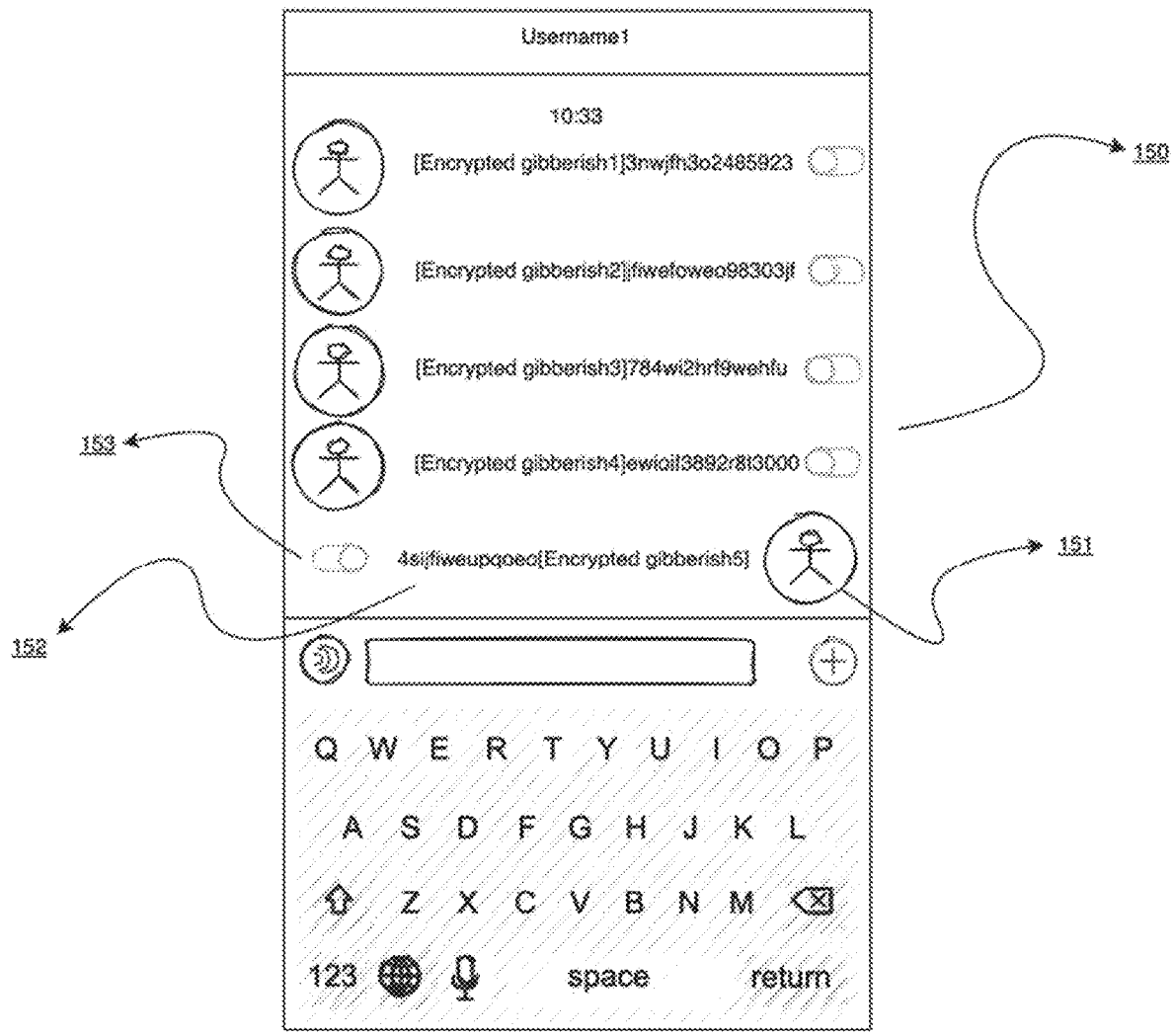
FIG. 1F illustrates an exemplary interface after the user confirms sending a message to a particular contact, according to an embodiment of the present invention.

FIG. 1F depicts an interface 150 after the user confirms sending a message to a particular contact after an existing conversation is established. The interface 150 may include the recipient's username of the existing conversation, the recipient's avatar, the encrypted message record, the unlock button, an encrypted message 152 and a message unlock button 153 displayed by the user confirming that the sent message is encrypted.

Figure 1G:
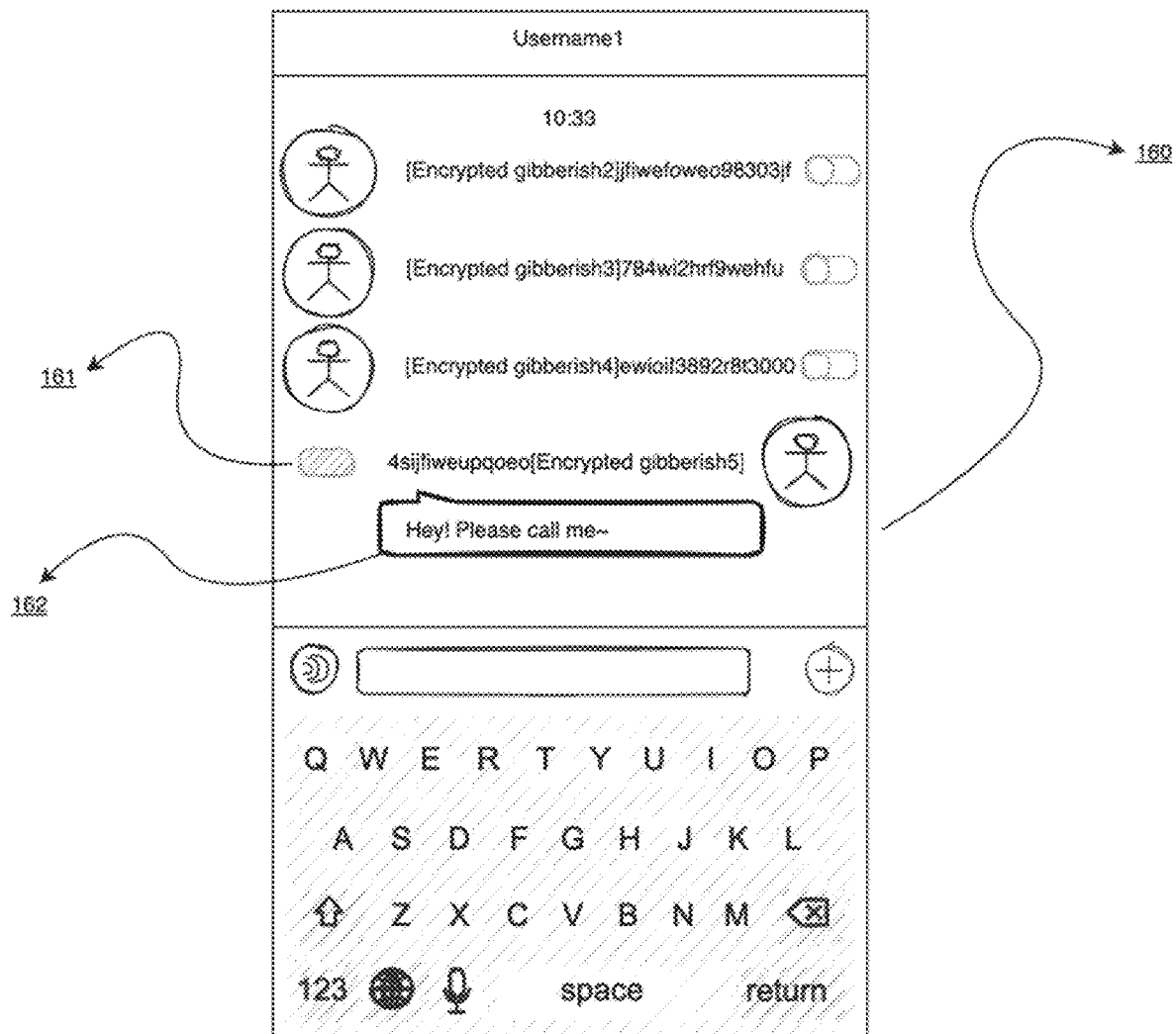
FIG. 1G illustrates an unlock message interface after the user confirms sending a message to a specific contact, according to an embodiment of the present invention.

FIG. 1G depicts an unlock message interface 160 after the user confirms sending a message to a specific contact after an existing conversation is established. The interface 160 may include the username of the recipient of the existing conversation, the avatar of the recipient, the encrypted message record, the button for unlocking each message, the unlocking button for the message, and the display after the unlocking of the encrypted message (displaying a decrypted message 162).

Figure 1H:
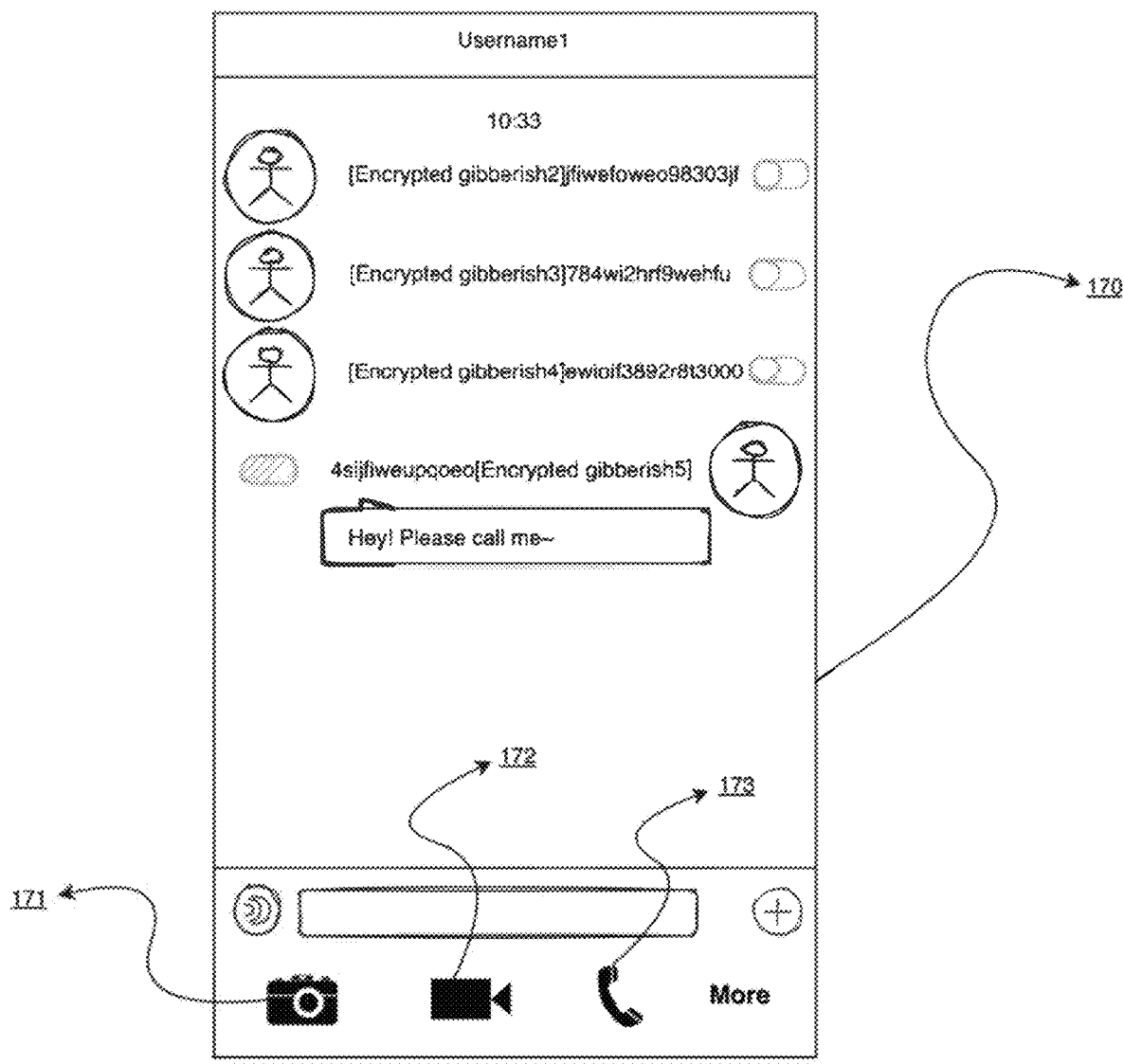
FIG. 1H illustrates a peer-to-peer messaging interface according to an embodiment of the present invention.

FIG. 1H depicts a peer-to-peer messaging interface 170 for a user to send a message to a specific contact after an existing conversation is established. The interface 170 can include the username of the recipient of the existing conversation, the avatar of the recipient, the encrypted message record, the button for unlocking each message, a button 171 for sending encrypted messages generated in the form of photos, and a button 172 for sending encrypted messages generated in the form of video. The encrypted video button 172, and a phone call button 173 can initiate a call to the recipient.

Figure 2:
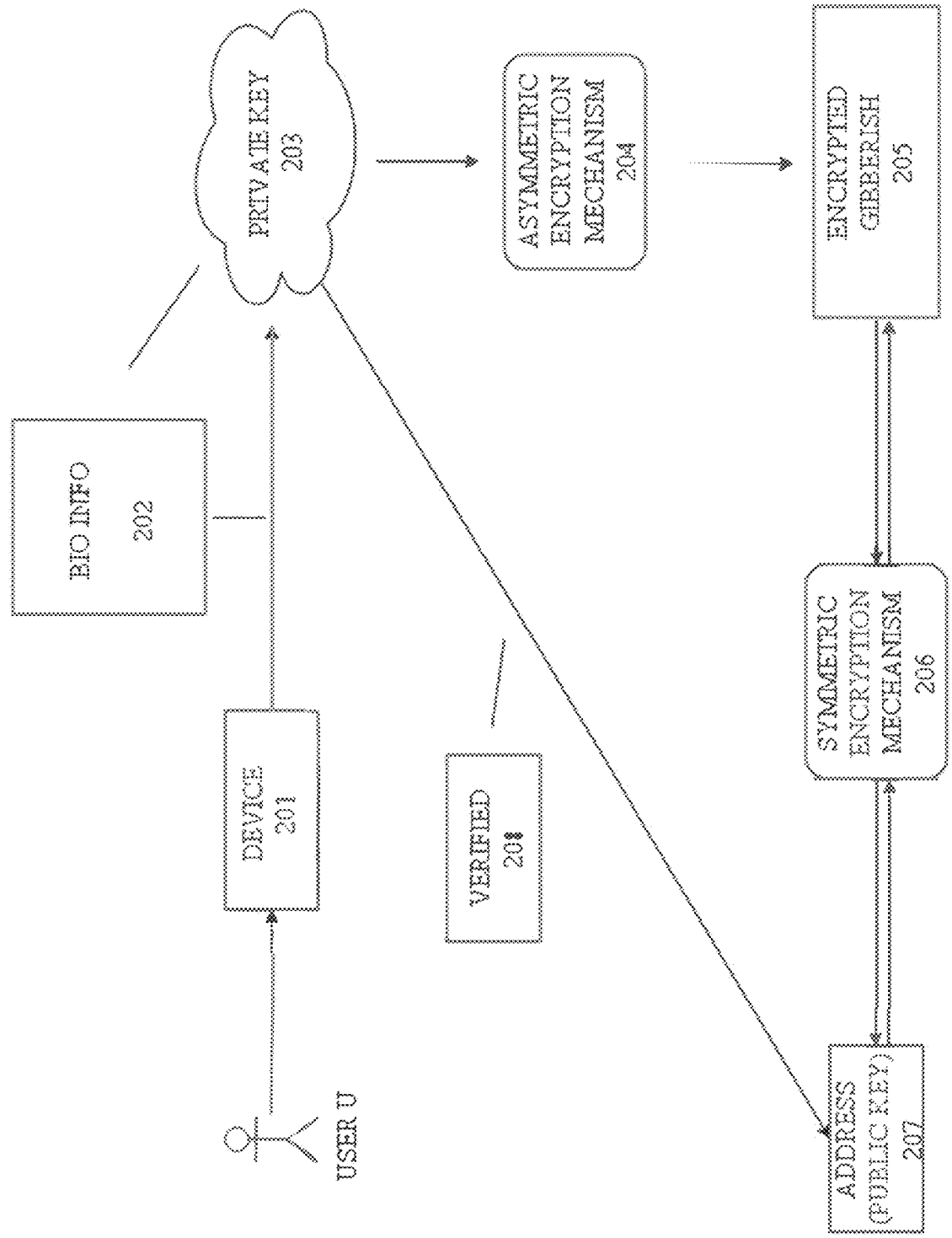
FIG. 2 depicts a method of generating a private key for a user account and a corresponding public key, according to an exemplary embodiment of the present invention.

FIG. 2 depicts a method of generating a private key for a user account and a corresponding public key. User U can collect his unique and identifiable biometric information credential 202 (including, but not limited to face id, fingerprint, or the like) through the device 201, and generate his own private key 203 that is unique to user U, and the private key is only owned by the user, and, due to the uniqueness of biological information, others cannot copy or steal it, thus ensuring the uniqueness and security of the private key.

Simultaneously, through the asymmetric encryption algorithm mechanism 204 (including, but not limited to, RSA (Rivest—Shamir—Adleman), Elgamal, Rabin, and ECC (Elliptic-curve cryptography), or the like, asymmetric encryption 204 is performed on the private key of the user U, and the encrypted garbled code 205 is generated. Due to the characteristics of the non-encryption algorithm, the encryption process is one-way, and the private key 203 cannot be reversely derived through the encrypted gibberish 205 (also referred to as encrypted garbled code 205), thereby increasing the security of the user U's private key.

In addition, the encrypted garbled code 205 can be encrypted again by a symmetric encryption algorithm mechanism 206 (including, but not limited to DES (data encryption standard), AES (advanced encryption standard), IDEA (international data encryption algorithm) or the like), to generate a public key 207 of user U, which can be used as the address of user U, for user U's identifying ID. The public key 207 can be made public so that the user U can be found by others. However, the private key 203 cannot be deduced or deciphered through the public key 207. However, the private key 203 can easily unidirectionally verify the public key 208, and the user U can easily use his unique and tamper-resistant private key 203 to enter his public key 207 account address for subsequent operations.

Figure 3:
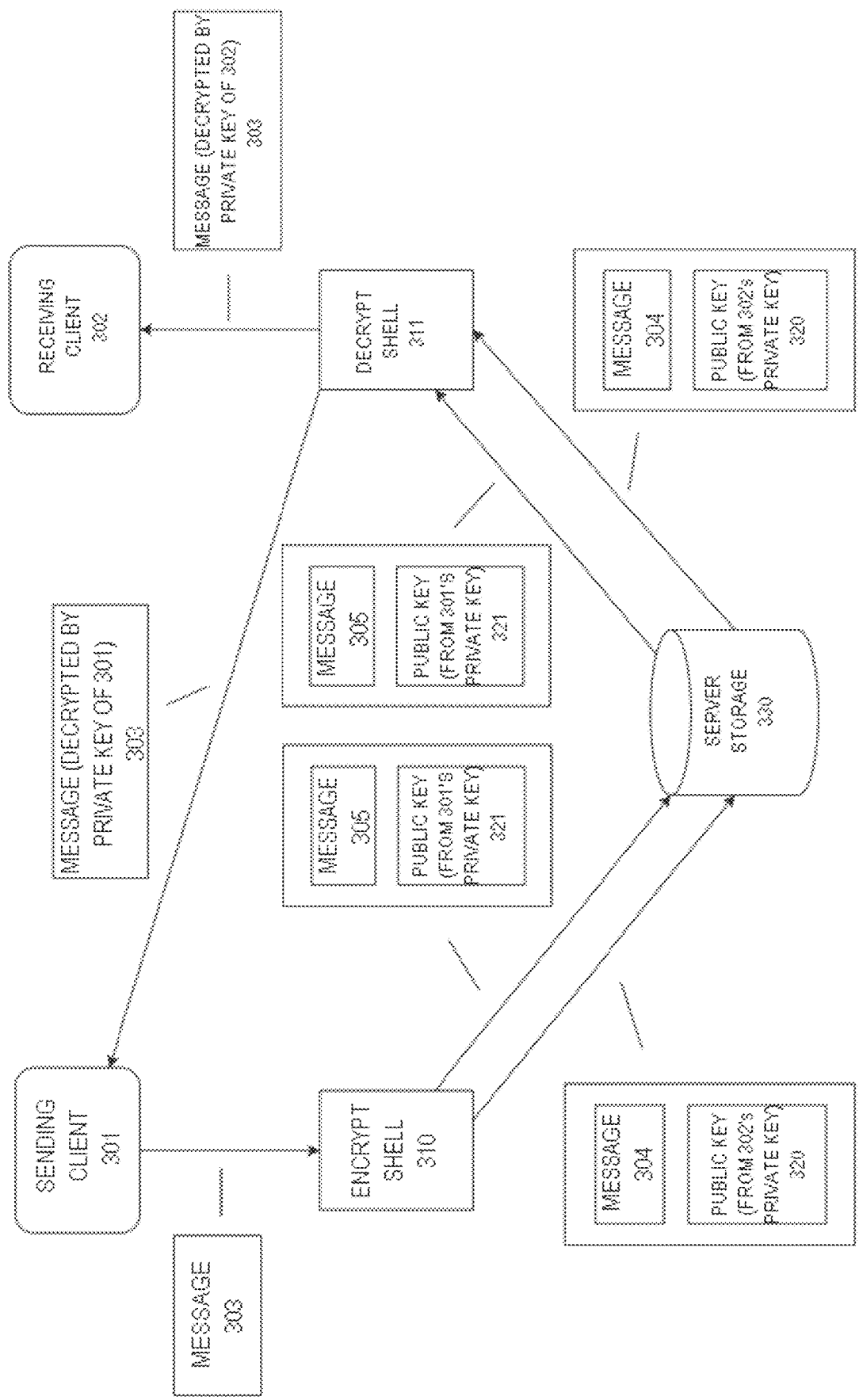
FIG. 3 depicts the entire flow of information from sender to receiver, according to an exemplary embodiment of the present invention.

FIG. 3 depicts the entire flow of information from sender to receiver. A sending client 301 can send a message 303 directly through a local encrypt shell 310 to directly copy the message in two copies, respectively, and encrypt the information separately through two encryption methods. One is a message 304 encrypted with the public key 320 of the user of the receiver client 302 (generated by the private key of the receiver client), and the other is the message 305 encrypted with the public key 321 of the user of the sender client 301 (generated by the private key of the sender client). Both encrypted messages 304 and 305 will be stored by server storage 330. A server housing the server storage 330 can be centralized (such as the database), decentralized (such as blockchain), a cloud server and a local server, or the like. Because all messages are stored as encrypted gibberish, the user's data privacy and security will not be lost even if the data is lost, and the user's local device will have all the information records that can be decrypted by the user self and the ownership completely belongs to the user. To a certain extent, a decentralized storage method is realized.

At the same time, the receiving client 302 can obtain the message 304 encrypted with the receiving client's public key 320 from the storage server 330. A local decrypt shell 311 can decrypt with the private key of the receiving client 302 to obtain the original message 303 that the sending client 301 wants to send to the receiving client 302.

On the other hand, the sending client 301 will obtain the message 305 encrypted with the sending client's public key 321 from the server storage 330. The local decrypt shell 311 decrypts with the private key of the sending client 301 to obtain a message 303 originally intended to be sent to the receiving client 302 by the sending client 301.

Above, as the sending client 301, not only can view its own historically sent messages, but also, as the receiving client 302, can view the history messages sent to itself by other users. There is one and only one's private key that can decrypt all of one's private data information, realizing complete control over the ownership of virtual assets.

Figure 4:
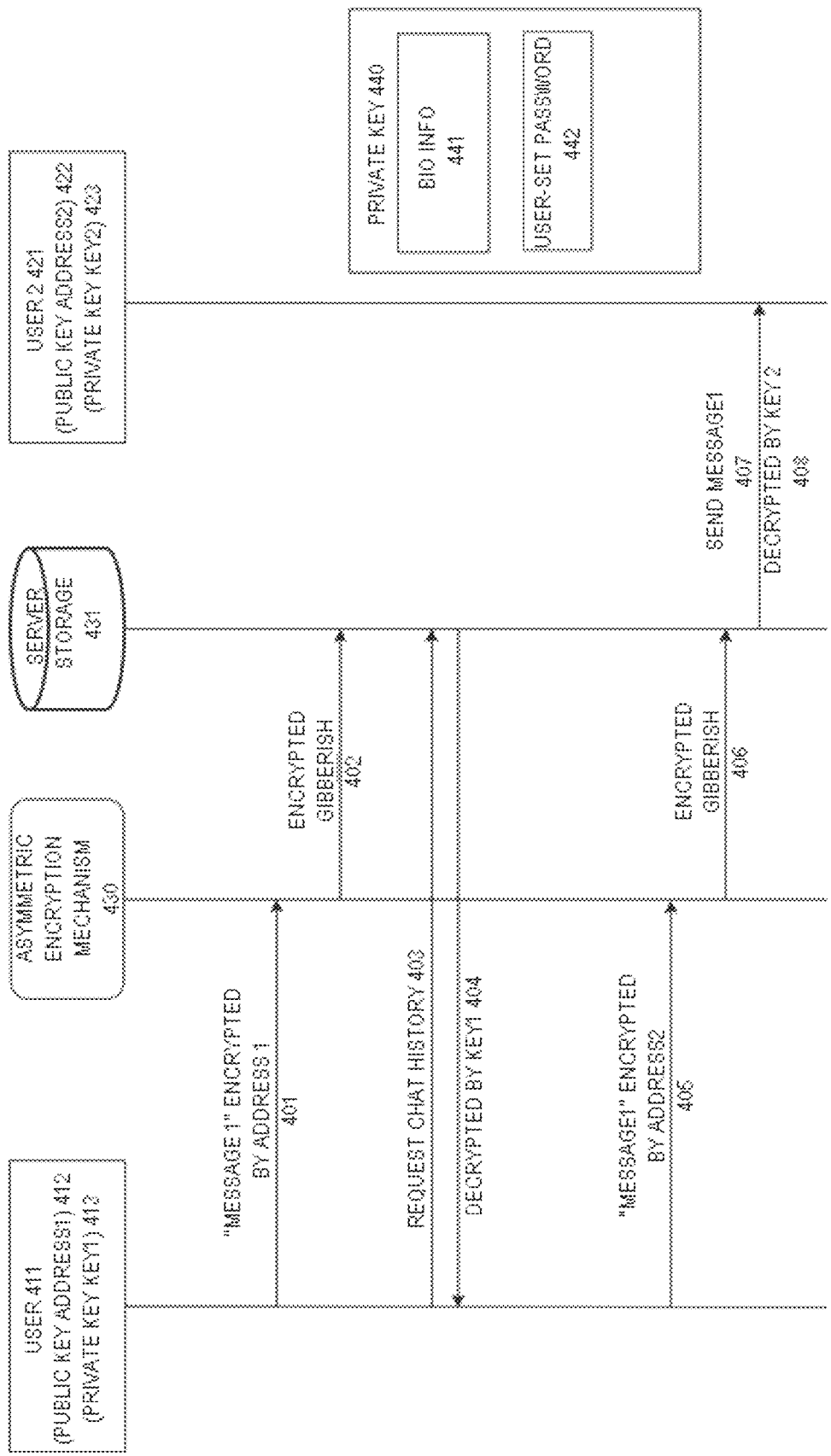
FIG. 4 depicts a data flow diagram for information transmission, according to an exemplary embodiment of the present invention.

FIG. 4 depicts a data flow diagram for information transmission. User 1 411 has a public key 412 (which can be used as user 1's address 1) and a private key 413 (Key 1). The message 1, sent by user 1, is first encrypted 401 with user 1's public key 412 through an asymmetric encryption mechanism 430. The encrypted gibberish 402 is stored in a server storage 431.

When user 1 411 wants to check his historical message record, user 1 411 can send a request 403 to the storage server 431, because all messages related to user 1 411 are encrypted by the public key 412 of user 1, so they can be easily separated and located. Then, by decrypting 404 through the private key 413 of the unique corresponding user 1, user 1 411 can directly view the historical message records related to himself.

Meanwhile, message 1 sent by user 1 411 will also be copied and encrypted 405 with the public key 422 of user 2 through the asymmetric encryption mechanism 430 to generate the encrypted garbled code 406 and store it in the storage server 431.

User 2 421 can receive the encrypted garbled code 406 sent from the storage server, and decrypt 408 by the private key 423 of the unique corresponding user 2, thereby checking the sent message 1 411.

The composition form of the private key 440 has many kinds, can be the biological information of the user, including but not limited to bio information 441, such as the face, fingerprint, or the like, or the user can choose to set the password 442 by himself, and so on, the private key form that only the user knows.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A method for generating encryption keys for users of a social chat computer system, comprising:
    generating data for each user of each respective user;
    generating a private key based on the data for each user;
    encrypting the private key with an asymmetric encryption mechanism to generate encrypted gibberish; and
    further encrypting the encrypted gibberish to generate a public key for each user.

2. The method of claim 1, wherein the encrypted gibberish is encrypted with a symmetric encryption mechanism.

3. The method of claim 1, wherein the data is based on biological information for each of the users.

4. The method of claim 3, wherein the biological data is selected from facial features or a fingerprint.

5. The method of claim 1, wherein the data is based at least in part on a password chosen by the user.

6. The method of claim 1, wherein the private key is unable to be deduced or deciphered through the public key.

7. The method of claim 1, further comprising unidirectionally verifying the public key with the private key of the user.

8. A method for securing a message sent from a first user to a second user within a social chat computer system, comprising:
   generating encryption keys for the first and second users by the steps of:
      generating data for each of the first and second users of each of the first and second users;
      generating a private key for each of the first and second users from the data for respective first and second users;
      encrypting the private key with an asymmetric encryption mechanism to generate encrypted gibberish; and
      further encrypting the encrypted gibberish with a symmetric encryption mechanism to generate a public key for each user;
   encrypting the message with the public key of the second user to generate second user encrypted gibberish;
   storing the second user encrypted gibberish in a server storage;
   sending, from the server storage, the second user encrypted gibberish to the second user; and
   decrypting the second user encrypted gibberish with the private key of the second user.

9. The method of claim 8, further comprising:
   encrypting the message with the public key of the first user to generate first user encrypted gibberish;
   storing the first user encrypted gibberish in the server storage;
   sending, from the server storage, the first user encrypted gibberish to the first user; and
   decrypting the first user encrypted gibberish with the private key of the first user.

10. The method of claim 9, further comprising:
   requesting a chat history, by the first user, from the server storage;
   sending requested first user encrypted gibberish from the server storage to the first user for the chat history requested by the first user; and
   decrypting the requested first user encrypted gibberish with the private key of the first user.

11. The method of claim 8, wherein the data is based on biological information of each of the first and second users.

12. The method of claim 11, wherein the biological data is selected from facial features or a fingerprint.

13. The method of claim 8, wherein the data is based at least in part on a password selected by the first and second users.

14. The method of claim 8, wherein the private key of each of the first and second users is unable to be deduced or deciphered through the public key of each of the first and second users.

15. The method of claim 8, further comprising unidirectionally verifying the public key of the first and second users with the respective private key of the first and second users.

16. A method for securing user data from a first user within a social chat computer system, comprising:
   generating encryption keys for the first user by the steps of:
      generating data for the first user;
      generating a private key from the data;
      encrypting the private key with an asymmetric encryption mechanism to generate encrypted gibberish; and
      further encrypting the encrypted gibberish with a symmetric encryption mechanism to generate a public key for the first user;
   encrypting the user data with the public key of the first user to generate first user encrypted gibberish;
   storing the first user encrypted gibberish in a server storage;
   sending, from the server storage, the first user encrypted gibberish to the first user; and
   decrypting the first user encrypted gibberish with the private key of the first user to provide the user data to the first user.

17. The method of claim 16, wherein the user data is a message sent from the first user to the second user, the method further comprising:
   generating encryption keys for the second user by the steps of:
      generating data for the second user;
      generating a second user private key for the second user from the data;
      encrypting the second user with an asymmetric encryption mechanism to generate second user private key encrypted gibberish; and
      further encrypting the second user private key encrypted gibberish with a symmetric encryption mechanism to generate a public key for the second user;
   encrypting the message with the public key of the second user to generate second user encrypted gibberish;
   storing the second user encrypted gibberish in a server storage;
   sending, from the server storage, the second user encrypted gibberish to the second user; and
   decrypting the second user encrypted gibberish with the private key of the second user.

18. The method of claim 17, wherein the data is based on biological information of each of the first user and the second user.

19. The method of claim 17, wherein the private key of each of the first and second users is unable to be deduced or deciphered through the public key of each of the first and second users.

* * * * *